Feb. 24, 1953 G. H. SILVA 2,629,687
SALT WATER STILL
Filed July 2, 1948
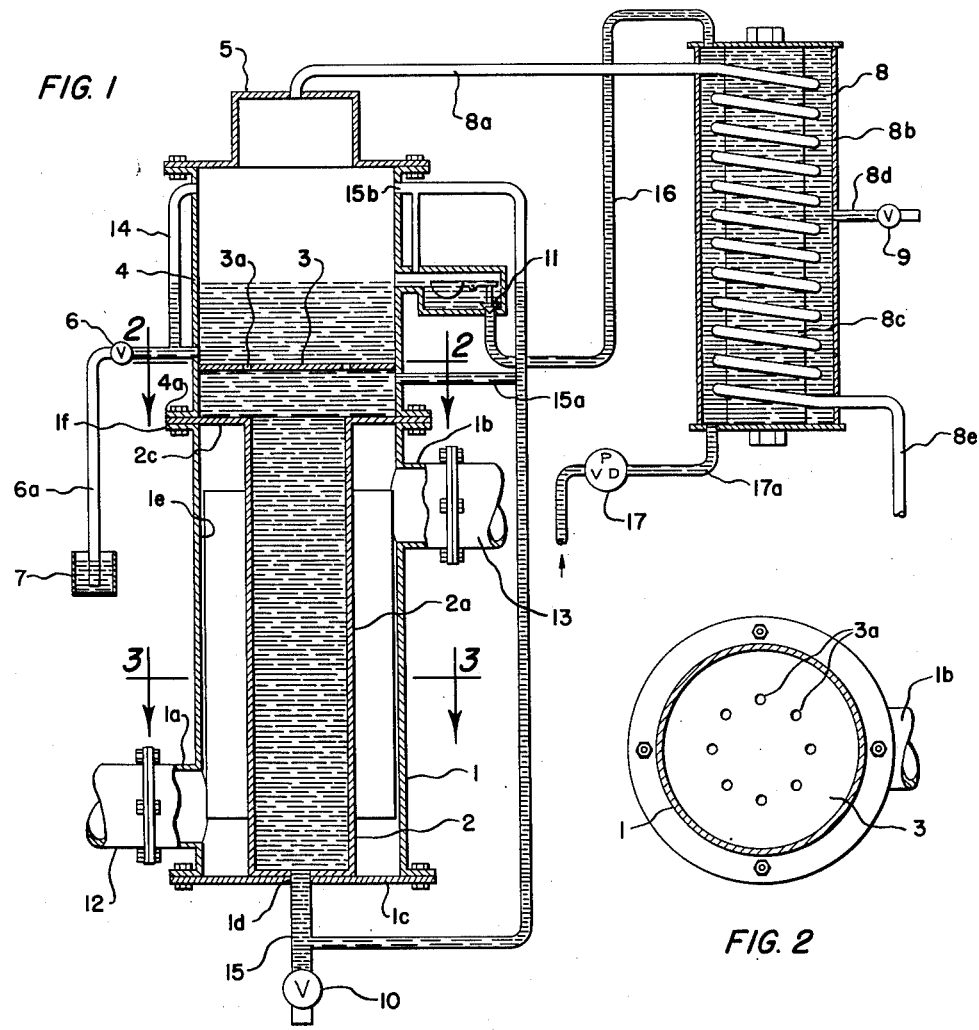
FIG. 1
FIG. 2
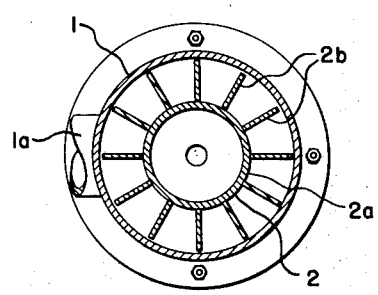
FIG. 3
INVENTOR.
GUY H. SILVA
BY
Wm. H. Dean
AGENT Patented Feb. 24, 1953

2,629,687

UNITED STATES PATENT OFFICE 2,629,687

SALT WATER STILL

Guy H. Silva, San Diego, Calif.

Application July 2, 1948, Serial No. 36,628

1 Claim. (Cl. 202—196)

My invention relates to a fresh water making apparatus for evaporating salt water, more particularly for use on board vessels at sea, and the objects of my invention are:

First, to provide an apparatus of this class which may be operated continually without accumulating undue salt crust, which reduces the efficiency of the evaporating apparatus;

Second, to provide an apparatus of this class having novel means for draining the heavy brine from the evaporating salt water, greatly reducing the tendency of the interior of the evaporating apparatus to accumulate a heavy salt crust;

Third, to provide an apparatus of this class in which the boiler thereof may be radically contracted by flushing the same with cold water, whereby salt crust internally of the boiler is compressed and broken away from the side walls of the boiler;

Fourth, to provide an apparatus of this class which produces a large volume of fresh water in proportion to its size and heat requirements;

Fifth, to provide an apparatus of this class which may be operated on the heat carried by the exhaust gases passing from the engine of a boat;

Sixth, to provide an apparatus of this class in which salt ocean water is used to condense steam into fresh water while the steam is concurrently used to preheat the salt water before entering the boiler of said apparatus; and Seventh, to provide an apparatus of this class which is very simple and economical of construction, efficient in operation and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claim, reference being had to the accompanying drawing and to the characters of reference thereon, forming a part of this application, in which:

Fig. 1 is a diagrammatic view of my fresh water making apparatus for evaporating salt water, showing structural details thereon in section to amplify the illustration; Fig. 2 is a plan sectional view of the structure taken from the line 2—2 of Fig. 1, and Fig. 3 is a plan view of the structure taken from the line 3—3 of Fig. 1.

Similar characters of reference refer to similar parts and portions throughout the several views of the drawing.

The heat exchange casing 1, boiler 2, baffle 3, brine chamber 4, steam dome 5, brine relief valve 6, sump 7, condenser 8, valves 9 and 10, float valve 11, heat inlet conductor 12, heat outlet conductor 13, water level indicator 14, and the tubes 15 and 16 constitute the principal parts and portions of my fresh water making apparatus for evaporating salt water.

The heat exchange casing 1 is a hollow cylindrical casing, having hollow tubular conductor portions 1a and 1b, communicating with opposed side walls thereof near opposite ends thereof, respectively. Connected to these conductor portions 1a and 1b are the heat inlet and outlet conductors 12 and 13, respectively, as shown best in Fig. 1 of the drawing. This heat exchange casing 1 is provided with enclosing plate 1c at its bottom portion, having an opening 1d therein through which the tube 15 extends into communicative relationship with the interior of the boiler 2, positioned centrally in the heat exchange casing 1. This boiler 2 is provided with a tubular body 2a, preferably made of material having a high coefficient of expansion, such as brass, which is preferably used because of its resistance to the action of salt water. Externally of this tubular body 2a are integral heat exchange fins 2b, which heat exchange fins extend a certain distance from the body 2a of the boiler 2 and into close proximity with the inner wall surface 1e of the heat exchange casing 1, all as shown best in Figs. 1 and 3 of the drawing. The lower end of this tubular body 2a of the boiler 2 is substantially enclosed, except for the inlet tube 15, communicating with the interior thereof. The normally upper end of the tubular body 2 is provided with an extending annular flange 2c, interposed between adjacent ends of the heat exchange casing 1 and the brine chamber 4, as shown in Fig. 1 of the drawing, the upper end of the heat exchange casing 1 is provided with a flange 1f, at the lower side of the flange 2c at the boiler body 2a, while the brine chamber 4, at its lower end, is provided with a flange 4a engaging the upper side of the flange 2c of the body 2a of the boiler 2. Thus, water is prevented from entering the heat exchange casing 1, externally of the tubular body 2a of the boiler 2, and the liquid is maintained in the brine chamber 4 substantially above the baffle 3, which is provided with a plurality of perforations 3a, as shown in Figs. 1 and 2 of the drawing. Connected to the upper end of the brine chamber 4 is the steam dome 5, having the tube 8a of the condenser 8, in communicative relationship therewith. This tube 8a extends into the water jacket 8b of the condenser 8 and is wound in helical form around a core member 8c and emerges from the jacket 8b near the lower end thereof, and extends to a fresh water supply tank. The pump 17 is provided with an outlet tube 17a communicating with the interior of the condenser jacket 8b at its lower end. This pump 17 supplies cold water which may be salt water into the condenser jacket 8b around the tube 8a on the core 8c. The cooling water in the jacket 8b communicates with an overboard tube 8d controlled by a pressure operated overflow valve 9. The tube 16 communicates with the interior of the condenser jacket 8b and is directly communicating with the float valve 11 at its opposite end. This float valve 11 is a conventional float valve, arranged to maintain the salt water at a certain level in the brine chamber 4, all as shown best in Fig. 1 of the drawing. The valve 10, communicating with the tube 15 is directly below the boiler 2, and communicating therewith is a purge valve, adapted to purge the brine and salt crust from the interior of the body 2a of the boiler 2. Communicating with the brine chamber 4, slightly above the baffle 3 therein, is the brine relief valve 6, adapted to relieve heavy brine in the brine chamber 4 slightly above the baffle 3, which carries a high salt content. Communicating with this valve 6 is a tube 6a which extends into the sump 7, which, located in a boat, may be either the bilge or other suitable air seal sump. The water level indicator 14 is a visual type indicator arranged to show the operating level of the liquid in the brine chamber 4. Communicating with the upper end of the brine chamber 4, considerably above the liquid level therein, is the upper end of the tube 15, which, as hereinbefore described, communicates with the lower inner side of the boiler body 2a. The tube 15 is provided with an intermediate communicating tube portion 15a, communicating with the interior of the brine chamber 4 slightly below the baffle 3 therein, all as shown best in Fig. 1 of the drawing.

The operation of my fresh water making apparatus for evaporating salt water is substantially as follows:

Heat is supplied through the heat inlet conductor 12, and this inlet conductor 12 may be connected with any suitable source of heat desired, but is normally used to conduct the hot exhaust gases from the engine of a boat at sea, and these hot gases pass into the heat exchange casing 1 around the fins 2b externally of the boiler body 2a, then the gases pass upwardly and outwardly through the heat outlet conductor 13. When the body 2a of the boiler 2 is heated to a certain temperature by conduction of the heat on the outer wall surface thereon and the fins 2b, salt water in the tubular body 2a is boiled and the steam rises upwardly through the brine chamber 4, into the steam dome 5, passes through the tube 8a and is condensed within said tube 8a internally of the conductor jacket 8b. The outlet portion 8e of the tube 8 extends to a fresh water supply tank. The steam passing through the tube 8a heats salt water in the condenser jacket 8b and the tube 16 conducts the heated water from the upper portion of the condenser jacket 8b to the float valve 11, which meters the introduction of the heated water into the brine chamber 4, over the baffle 3. It will be noted that when steam is rising through the openings 3a of the baffle 3, that the water supply is initially dissipated from the tubular body 2a of the boiler 2, and eventually the entire supply of water being evaporated is positioned above the baffle 3 due to the fact that certain velocity through the openings 3a in the baffle 3 prevents volume movement of the water downwardly into the boiler body 2a, whereby the water above the baffle 3 is steam heated by the steam passing through the holes 3a. This action provides uniform meeting of the water to the boiling surfaces of the boiler body 2a. The annular row of holes 3a is substantially close diametrically to the internal of the heater body 2a, so that the occasional gravitation of droplets of water through the openings 3a passes downwardly along the hot internal wall of the boiler body 2a. Thus, it is to be noted that when the apparatus is in constant operation, the water supply which is introduced to the baffle 3a is substantially maintained thereabout, and water is only supplied through the boiler body 2a when the steam velocity through the openings 3a is reduced sufficiently to commit the dispensation of water by gravitation to the boiler body 2a. During operation of the apparatus, the salt water in the brine chamber 4 increases specific gravity, and the dense brine settles to a position slightly above the baffle 3. The brine relief valve 6, communicating with the brine chamber 4, slightly above this baffle 3, provides means for manually or automatically venting the dense brine from the brine chamber 4 at certain intervals so that the specific gravity of the brine may be maintained at a reasonable level. The dense brine emitted from the valve 6 passes downwardly into the sump 7 which may be conveniently supplied by the bilge of a boat, if desired. Thus, the lower end of the tube 6a is beneath the liquid level in the bilge, providing a liquid seal at the end of said tube 6a. Normal operation or any variation in the brine level in the brine chamber 4 may be observed through the indicator 14, which is preferably a glass tube in which the liquid rises. It will be here noted that the temperature of the liquid above the baffle 3 may increase in proportion to the increase in specific gravity, and such temperature may be employed to automatically control the valve 6 for draining the dense brine from the upper side of the baffle 3 as desired, such control may be accomplished by various several switches and solenoid equipment, or the like, which is conventional. During operation of the apparatus, evaporation of the salt water on the internal walls of the body 2a of the boiler 2 causes collection of salt crust, and in order to remove this salt crust the valve 10 is opened, causing steam pressure to exhaust through the tube 15, with consequent drainage of the liquid through the openings 3a from the upper side of the baffle 3. This gravitation occurs readily when the valve 10 is opened, because the weight of the liquid is heavier than steam, which drives the steam outwardly through the tube 15 vented by the valve 10. After all of the hot liquid has passed through the valve 10, the float valve 11 is automatically opened and relatively cold water passes inwardly through the tube 1y, and downwardly into the boiler body 2a. This boiler body is made of material which, having a high coefficient of expansion, contracts to a considerable degree when the cold water passes thereinto. This contraction causes compression of the salt crust which has formed a lining inside the tubular boiler body 2a. Compression of this salt crust causes the same to fall away from the internal wall which is a smooth wall, preferably of brass material, and this salt crust then gravitates to the bottom of the boiler 2. Some of the particles are exhausted through the valve 10 initially, while other particles are dissolved and flow outwardly through the tube 15, vented by the valve 10. Thus, each time operation of the apparatus is stopped salt crust is removed from the boiler, which maintains the boiler in a thermally efficient condition. The removal of dense brine above the baffle 3 further improves the efficiency due to the maintenance of a low boiling temperature of the fluid and also eliminates a considerable portion of the salt. The pump 17 may be the water pump of the engine used to propel the boat, and this water pump forces cool sea water into the condenser 8 through the tube 8a. The tube 15 is provided for use in thermally circulating liquid from the brine chamber 4 downwardly into the lower end of the boiler body 2a when an initial overload of liquid is supplied to the interior of the brine chamber 4 and boiler 2. Thus, the water level in the brine chamber 4 is prevented from rising upwardly into the steam dome 5 because the water is relieved by the upper end 15b of the tube 15 into which thermal circulation takes place, and in which the water is readily gravitated to the lower portion of the boiler body 2a containing only steam. The pressure of the water and the steam being equal, the water gravitates into the lower portion of the boiler 2.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claim.

Having thus described my invention, what I claim as new and desire to secure by Letters Patent is:

In a fresh water making apparatus of the class described, a boiler having a single cylindrical chamber defined by vertical walls of a material having a high coefficient of expansion, said walls being plane on the inside and having vertical integral vanes on the outside, a heating chamber surrounding said single chamber and vanes, said single chamber having an open upper end, a brine chamber fixed to the upper end of said boiler and having an open bottom communicating directly with said open upper end of said boiler, said chamber having a steam outlet at its upper end, a condenser connected to said outlet, a baffle in the lower portion of said brine chamber and extending horizontally across said brine chamber to divide the same into upper and lower parts, said baffle having restricted openings therein, a water inlet leading from said condenser to said brine chamber, said openings allowing restricted flow between the upper and lower parts of said brine chamber and comprising a steam outlet for said boiler, and water inlet control means communicating with the interior of said brine chamber above said baffle and responsive to the level of the brine in the brine chamber, and a tube leading downwardly from the bottom of the single chamber of the boiler and having a purge valve therein.

GUY H. SILVA.

REFERENCES CITED

The following references are of record in the file of this patent:

UNITED STATES PATENTS

| Number | Name | Date |
|---|---|---|
| 160,951 | Prentiss | Mar. 16, 1875 |
| 764,711 | Corcoran | July 12, 1904 |
| 1,010,508 | McCune | Dec. 5, 1911 |
| 1,104,948 | Woolner | July 28, 1914 |
| 1,780,977 | Leslie | Nov. 11, 1930 |
| 2,096,748 | Kermer | Oct. 26, 1937 |
| 2,124,729 | Castner | July 26, 1938 |
| 2,239,470 | Schich | Apr. 22, 1941 |
| 2,254,980 | Simmons | Sept. 2, 1941 |
| 2,274,066 | Jacocks | Feb. 24, 1942 |
| 2,283,201 | Gillette et al. | May 19, 1942 |
| 2,330,057 | Hunter | Sept. 21, 1943 |
| 2,392,893 | Williamson | Jan. 15, 1946 |